United States Patent [19]

Staudte

[11] Patent Number: 4,899,587
[45] Date of Patent: * Feb. 13, 1990

[54] METHOD FOR SENSING ROTATION USING VIBRATING PIEZOELECTRIC ELEMENTS

[75] Inventor: Juergen H. Staudte, Anaheim, Calif.

[73] Assignee: Piezoelectric Technology Investors, Limited, Laguna Hills, Calif.

[*] Notice: The portion of the term of this patent subsequent to Jun. 25, 2002 has been disclaimed.

[21] Appl. No.: 27,104

[22] Filed: Mar. 13, 1987

Related U.S. Application Data

[60] Continuation of Ser. No. 733,719, May 13, 1985, abandoned, which is a division of Ser. No. 572,783, Jan. 23, 1984, Pat. No. 4,524,619.

[51] Int. Cl.$^4$ .............................................. G01P 9/04
[52] U.S. Cl. .................................................... 73/505
[58] Field of Search ................... 73/505; 310/323, 331

[56] References Cited

U.S. PATENT DOCUMENTS 4,524,619 6/1985 Staudte ................................. 73/505
4,654,663 3/1981 Alsenz et al. .......................... 73/505

FOREIGN PATENT DOCUMENTS 861436 2/1961 United Kingdom .

Primary Examiner—John Chapman
Attorney, Agent, or Firm—Flehr, Hohbach, Test, Albritton & Herbert

[57] ABSTRACT

A vibratory angular rate sensor system preferably consists of a Z-cut quartz plate forming a mounting frame with a rectangular opening. Within the opening are mounted two pairs of tines. Each pair of tines is parallel to each other, one pair forming the drive tines and the other pair the output tines. Each corresponding set of two tines is disposed along the same axis having a common stem or base. The tines are secured by four bridges integral with the frame and connected to the stem. The arrangement is such that the pair of input tines vibrates in opposition to each other, while the pair of output tines vibrates with one tine going up while the other moves downwardly. As a result, the angular rate sensors drive frequency and the structural torque frequency are unequal. Therefore large displacements of the stem are unnecessary.

3 Claims, 1 Drawing Sheet

METHOD FOR SENSING ROTATION USING VIBRATING PIEZOELECTRIC ELEMENTS

This is a continuation of application Ser. No. 733,719 filed May 13, 1985, abandoned, which is a division of application Ser. No. 572,783, filed Jan. 23, 1984, now U.S. Pat. No. 4,524,619.

CROSS-REFERENCES TO RELATED APPLICATIONS

The present application may be considered to be an improvement and an extension of the principles of a prior application entitled, "Angular Rate Sensor System," to Alsenz, at al., Ser. No. 06/321,964, filed Nov. 16, 1981. The present application is assigned to the same assignee as is the prior copending application.

The present application is also related to a copending application to Juptner, et al., entitled, "A Vibratory Angular Rate Sensing System," filed concurrently with the present application. The present application discloses a different configuration which substantially cancels all undesirable first and second harmonics of the output frequencies which represent noise.

BACKGROUND OF THE INVENTION

The angular rate of motion of a craft is an essential input for all navigational and inertial guidance systems. Such systems are used conventionally for aircraft, spacecraft, ships, or missiles. The sensing of the angular rate of motion is presently accomplished by means of a gyroscope.

Gyroscopes, however, have various disadvantages. They must be built to extremely high accuracies and may have drift rates of fractions of a degree per hour. Due to the expense of building them, they are very costly; they are physically large and heavy. They must be frequently and precisely maintained, for the reason that critical movable elements, such as bearings, may change with time. They may also be damaged by even low levels of shock and vibration. This, in turn, may cause an increase of unknown size in the drift rate, occurring at unknown times.

Because gyroscopes are sensitive to the effects of shock and vibration, they frequently have heavy mounting configurations to protect them, which also are expensive.

SUMMARY OF THE INVENTION

It will accordingly be obvious that it is desirable to replace a gyroscope by some other device which is less expensive and which is capable of measuring angular rates, thereby measuring the attitude of a vehicle or craft. In accordance with the present invention, this is accomplished by a balanced resonant sensor. Such a sensor is represented, in accordance with the present invention by a tuning fork. The tuning fork should be substantially mechanically temperature stable, having low internal friction and following Hook's Law. According to Hook's Law, the strain set up within an elastic body is proportional to the stress to which the body is subjected by the applied load (the strain, however, must be within the elastic limit of the body), and the body will return to its original shape when the stress is removed.

Preferably, but not necessarily, the tuning fork consists of quartz. However, other piezoelectric materials may be used, such as synthetic crystals; for example, ethylene diamine tartrate (EDT), dipotassium tartrate (DKT) or ammonium dihydrogen phosphate (ADP). Non-piezoelectric materials may by used with an electromagnetic drive.

In accordance with the present invention there is provided a wafer of piezoelectric materials, preferably of Z-cut quartz. The wafer is cut to provide a frame having an opening within which are provided two pairs of tines. The two tines in each pair are parallel with each other and are interconnected by a stem. This vibratory structure is secured to the frame by a pair of suspension bridges disposed close to each other, integral with the frame and extending to the stem.

The first pair of tines is excited by a drive oscillator in such a manner that the two tines will move toward each other and, after an instant, away from each other. The other pair of tines represent the output tines, and they will vibrate due to an applied external force in such a manner that while one tine moves up, the other moves down, and vice versa.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENT

Figure 1:
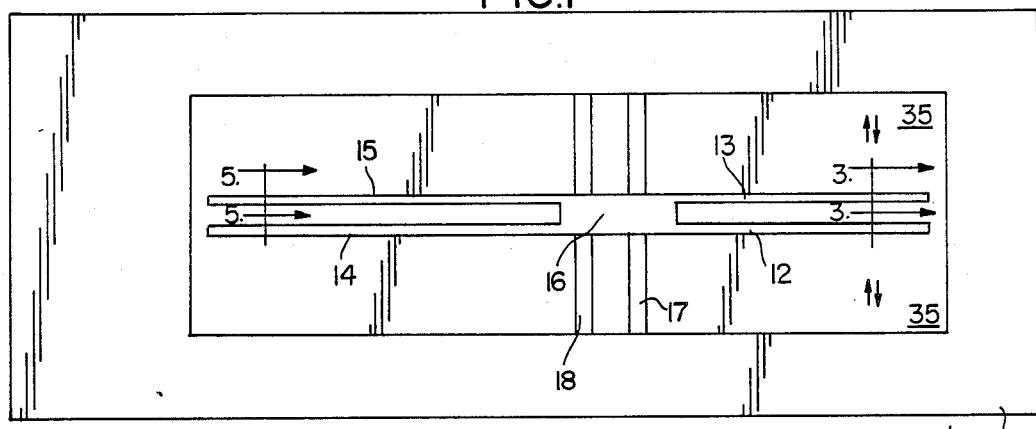
FIG. 1 is a top plan view of a vibratory angular rate sensor system embodying the present invention.
Figure 2:
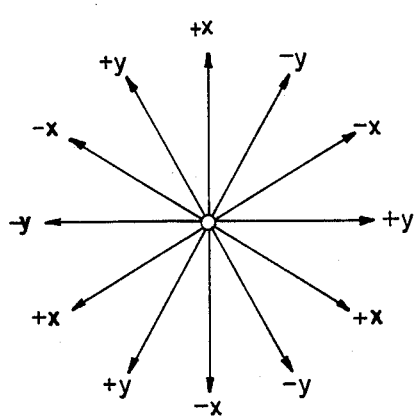
FIG. 2 illustrates the triagonal crystalline orientation of a Z-cut quartz wafer.

Referring now to the drawing and particularly to FIG. 1, there is illustrated a vibratory angular rate sensor embodying the present invention. The sensor system includes a wafer 10 forming a mounting frame which preferably is a piece of Z-cut quartz. The crystalline orientation of the quartz is shown in FIG. 2. The mounting frame 10 is of rectangular configuration and has a rectangular central opening 11. The orientation of the wafer is shown adjacent to FIG. 1, illustrating the X, Y, and Z axes. Disposed within the opening 11 is a first pair of tines 12 and 13, arranged substantially parallel to each other. These tines 12, 13 represent the input or drive tines. A second pair of tines 14 and 15 are the output tines and are also disposed parallel to each other and have common axes with the respective tines 12, 13. The two pairs of tines 12, 13 and 14, 15 are interconnected by a stem or base 16.

The resonant system of the two pairs of tines 12, 13 and 14, 15 (the former being the input tines and the latter pair forming the output tines) is secured to the frame by four suspension bridges 17, 18. The suspension bridges 17, 18 are integral with the frame 10 and are secured to the stem of base 16.

By way of example, the side of the frame 10 may have a length of 0.400 inch (in the X direction), the long side may have a length of 1.050 inch (in the Y direction) and the thickness (in the Z direction) may amount to 0.020 inch. However, it will be understood that other dimensions may be used for different materials or other purposes.

Figure 3:
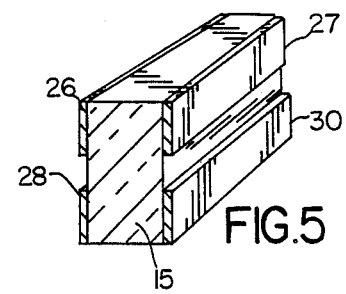
FIG. 3 is a cross-sectional view taken along lines 3—3 of one of the first pair of tines and showing the drive electrodes as well as the drive oscillator.
Figure 4:
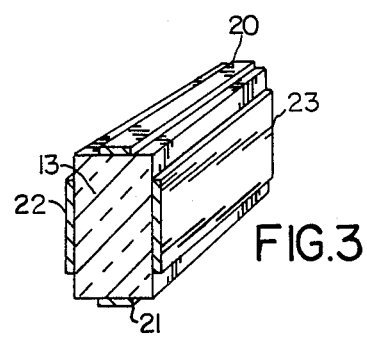
FIG. 4 is a schematic view of the pair of electrodes of FIG. 3 and a drive oscillator.

The tines 12, 13 may be energized by a pair of electrodes illustrated in FIG. 3. Thus, there are two pairs of electrodes 20, 21 and 22, 23. Each pair 20, 21 and 22, 23 is connected together and across a drive oscillator 25. (See FIG. 4). The electrodes 20, 21 extend in the Y direction, while the electrodes 22, 23 extend in the Z direction.

Figure 5:
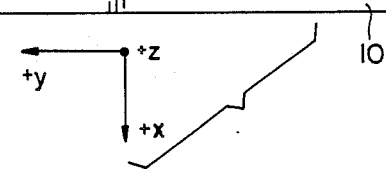
FIG. 5 is a similar cross-sectional view to that of FIG. 3 but taken along lines 5—5 through one of the tines of the second pair of tines and showing two pairs of output electrodes.
Figure 6:
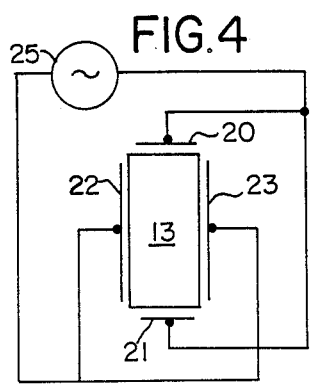
FIG. 6 is a schematic view of the pair of electrodes of FIG. 5 and an output circuit.
Figure 6:
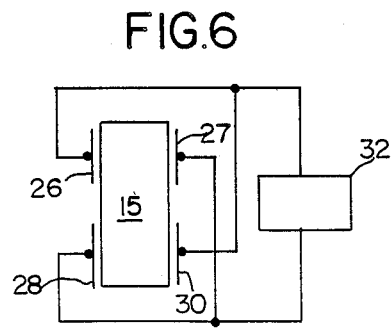

As illustrated in FIGS. 5 and 6, the output signal is derived at both the output tines 14, 15 by means of a first pair of output electrodes 26, 27 and a second pair of electrodes 28, 30. The output signals from both output tines 14 and 15 are connected in parallel. For convenience, only the output electrodes and output leads of one of the output tines have been illustrated. All of the output electrodes extend in the Y-Z direction. The output electrodes 26 and 30 are connected together, while the other electrodes 27 and 28 are also connected together and across an output circuit 32. This may be any conventional output circuit as well known in the art.

The structure of FIG. 1 may be chemically etched by means of photolithography from a suitable quartz wafer, or else it may be machined by a laser beam, ultrasonic machining, or other methods well known in the semiconductor art. The electrodes 20 to 23 and 26 to 30 may be obtained by gold-plating the respective tines and by removing unnecessary portions of the gold film, for example by a laser beam or by chemical etching.

The tines 12 and 13 resonate in the fundamental flexural mode in the X-Y plane. This is shown by arrows 35 in FIG. 1 which show movement in directions lying in the plane of the paper. The frequency in the X-Y plane is substantially lower than that in the Y-Z plane; that is, the plane in which the tines 14 and 15 vibrate. Hence the tines 14, 15 vibrate in opposite directions, up and down.

When the entire structure rotates about the Y axis and in the X-Y plane, the X-Y flexure plane vibration is conserved and therefore a flexure in the Y-Z plane is initiated. This motion is represented by the arrows 36 in FIG. 1 which show motion in directions perpendicular to the plane of the paper. The rotation in the X-Y plane may be caused by the angular motion of the vehicle carrying the system. As a result, the stem 16 is twisted due to the Coriolis force which acts normal to the plane of vibration of tines 12 and 13. This, in turn, causes an up-and-down motion of the output tines 14, 15 in opposite directions.

It should be noted that the Y-Z flexural frequency is higher than the X-Y flexural frequency. Stated another way, a torque is felt by the stem 16. This, in turn, initiates or drives an Y-Z flexure in output tines 14, 15. This is so because the frequency is substantially similar to that of the tuning fork consisting of tines 12, 13. The X-Y flexure in tines 12 and 13 is piezoelectrically driven by the input electrodes 20 to 23 of FIG. 3. On the other hand, the Y-Z flexure caused by a rotation about the axis Y in tines 14, 15 is picked up piezoelectrically by the output electrodes 26 to 30 of FIG. 5.

The bridges 17, 18 have an X-Z flexural frequency which is substantially that of the flexural frequency of the tines 12, 13.

The electrodes and shielding connections for the input and output circuits are preferably made from the bridges 17, 18. It should be noted that the frequency and balance of the two pairs of tines 12, 13 and 14, 15 are adjusted by adding or removing material, such as a gold film, at the free ends of the tines on the appropriate sides. This may be effected by chemical etching or by a laser beam.

The rate sensors of the prior art depend on the flexural frequency of the drive tines being substantially the same as the torsional frequency of the entire system. According to the present invention, the drive frequency of the angular rate sensor and the structural torsional frequency are not the same. Therefore, large displacements of the stem 16 are not necessary. The displacement of the stem 16 is extremely small relative to that of the pickup or output tines 14, 15. This is due to the $\Omega$ multiplication of the displacement of the tines with respect to the entire structure. It will now be understood that the vibration of the angular rate sensor is easily isolated from the mounting frame 10 and hence from the environment.

What is claimed is:

1. A method of sensing rotation, comprising the steps of:
   vibrating a first pair of piezoelectric tines at a first frequency; and
   sensing piezoelectric voltages in a second pair of tines parallel to and interconnected with said first pair of tines, said voltages induced in the second pair of tines by the vibration of said second pair of tines being caused by the vibration of said first pair of tines and the rotation of said first and second pair of interconnected tines.

2. In a method for sensing angular rate by the use of a dual fork structure having first and second interconnected forks lying in planes and carried by a support structure with the first fork having a major axis of symmetry, coupling energy into the first fork to cause vibratory motion of the first fork in the plane of the first fork and sensing vibratory motion of the second fork in a direction normal to the plane of the second fork caused by vibration and rotation of the first fork to provide a measure of the input angular rate about the major axis of symmetry of the first fork, said vibratory motions of the first and second forks being isolated from vibrations of the support structure.

3. A method as in claim 2 together with the step of operating the first fork at a resonant frequency which is lower than the frequency of the second fork.

* * * * *